United States Patent [19]

Sakano et al.

[11] Patent Number: 5,543,700
[45] Date of Patent: Aug. 6, 1996

[54] DRIVER CIRCUIT AND A DRIVING METHOD FOR A VARIABLE-RELUCTANCE MOTOR

[75] Inventors: Tetsuro Sakano; Kohei Arimoto, both of Yamanashi, Japan

[73] Assignee: Fanuc Ltd., Yamanashi, Japan

[21] Appl. No.: 244,651

[22] PCT Filed: Sep. 30, 1993

[86] PCT No.: PCT/JP93/01404

§ 371 Date: Jun. 6, 1994

§ 102(e) Date: Jun. 6, 1994

[87] PCT Pub. No.: WO94/08391

PCT Pub. Date: Apr. 14, 1994

[30] Foreign Application Priority Data

Oct. 7, 1992 [JP] Japan ............................ 4-291937

[51] Int. Cl.⁶ .................................................. H02D 1/46
[52] U.S. Cl. ........................................ 318/701; 318/254
[58] Field of Search ............................ 318/254, 701, 318/790–811

[56] References Cited

U.S. PATENT DOCUMENTS

| | | | |
|---|---|---|---|
| 4,158,163 | 6/1979 | Eriksen et al. | 318/798 |
| 4,286,202 | 8/1981 | Clancy et al. | 318/696 |
| 4,734,634 | 3/1988 | Kito et al. | 318/778 |
| 4,760,316 | 7/1988 | Hedlund | 318/254 |
| 4,806,813 | 2/1989 | Sumi et al. | 310/254 |
| 4,879,502 | 11/1989 | Endo et al. | 318/808 X |
| 5,051,680 | 8/1991 | Belanger | 318/254 |
| 5,146,148 | 8/1992 | Voet | 318/803 |

FOREIGN PATENT DOCUMENTS

| | | |
|---|---|---|
| 0476152A1 | 3/1992 | European Pat. Off. . |
| 22-54993 | 10/1990 | Japan . |
| 31-69288 | 7/1991 | Japan . |
| 52-60791 | 10/1993 | Japan . |

Primary Examiner—David S. Martin
Attorney, Agent, or Firm—Staas & Halsey

[57] ABSTRACT

A variable-reluctance motor is driven by means of a driver circuit which is composed of a common switching device and switching devices corresponding to individual phases. The sum (total current $i_t$) of currents flowing through coils for the individual phases is detected. The duty ratio of a PWM signal for turning on and off the common switching device is computed in accordance with the deviation between the total current $i_t$ and a current command $i_{cmd}$ and the sign (positive or negative) of the deviation. Also, the on-off operation of the switching device corresponding to each phase is controlled depending on the excitation phase based on the rotor electrical angle and on whether the sign of the deviation is positive or negative. In this manner, current loop control is executed so that the detected total current $i_t$ follows up the current command $i_{cmd}$. Thus, the current is continuously controlled even during a period for the change of the excitation phase, so that the occurrence of a torque ripple can be restrained.

3 Claims, 3 Drawing Sheets

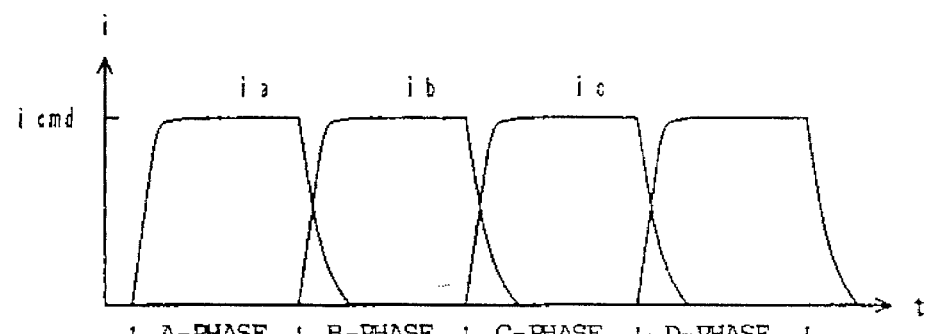
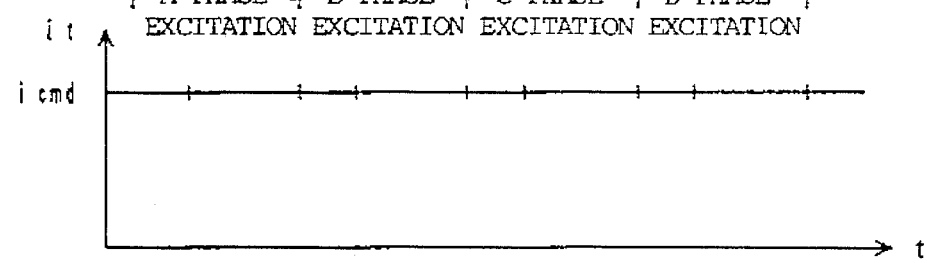
FIG. 3A
FIG. 3B
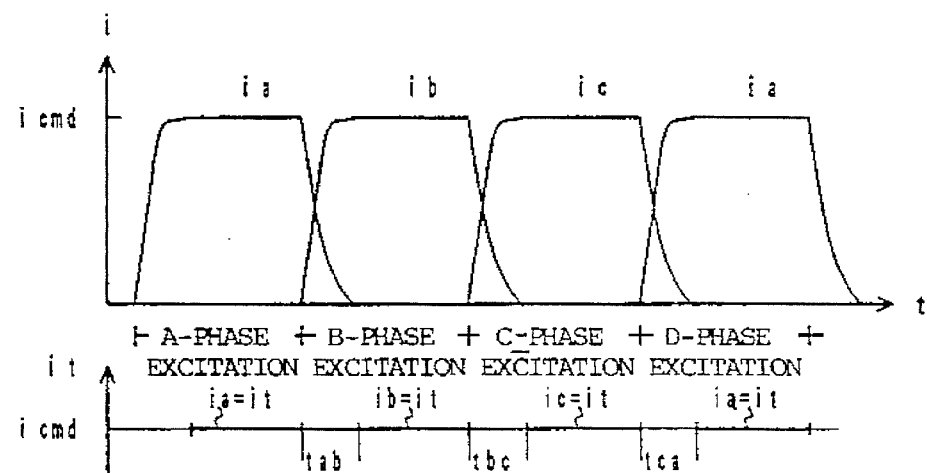
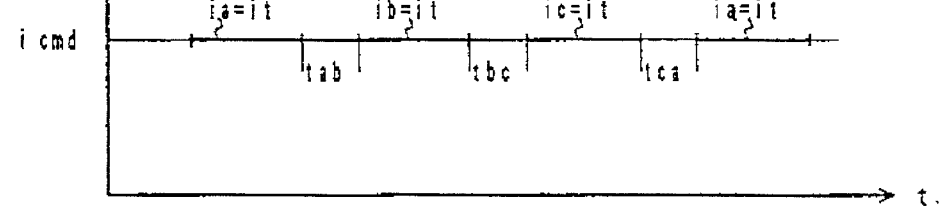
FIG. 4A
PRIOR ART
FIG. 4B
PRIOR ART

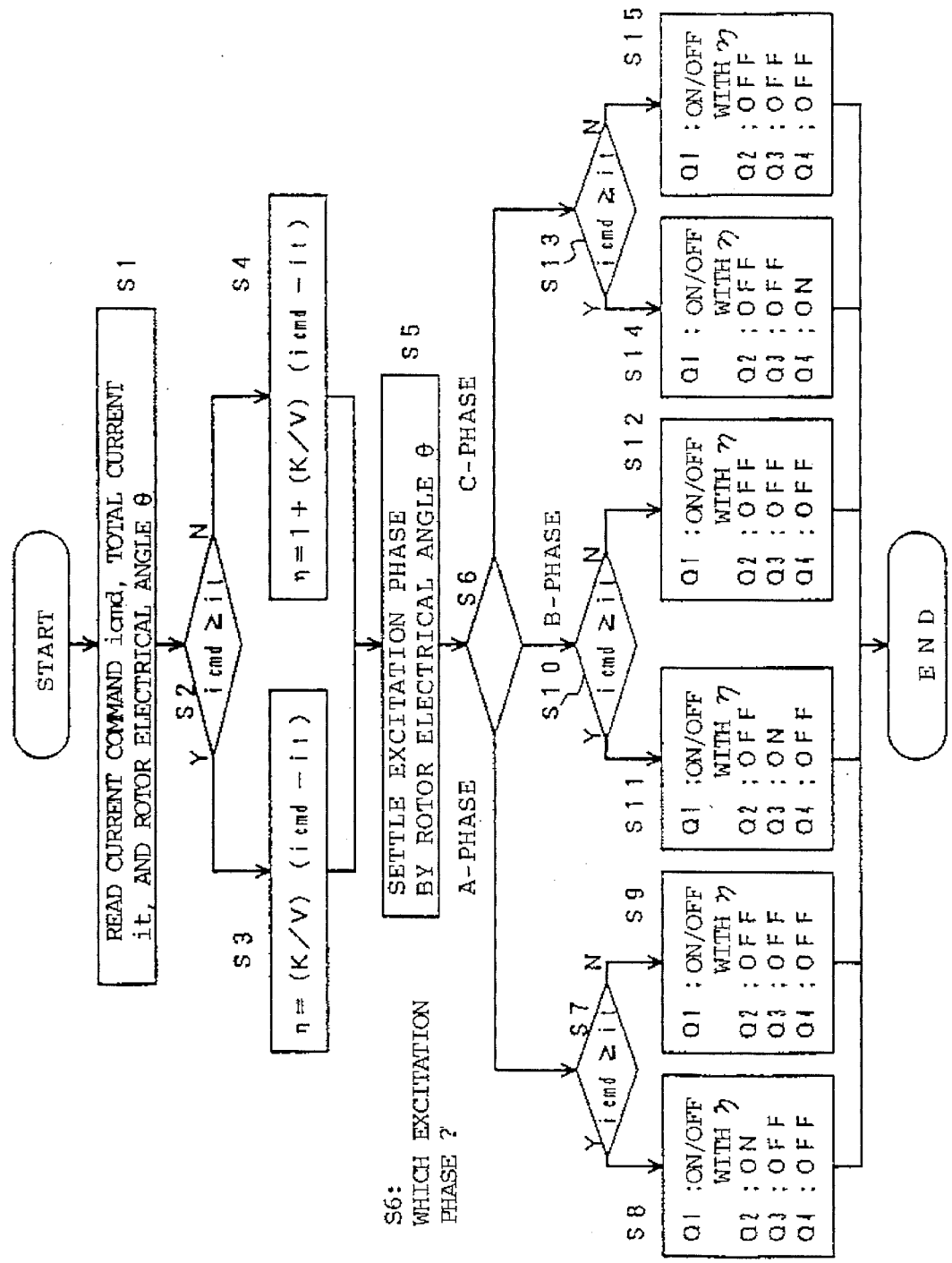

DRIVER CIRCUIT AND A DRIVING METHOD FOR A VARIABLE-RELUCTANCE MOTOR

TECHNICAL FIELD

The present invention relates to a driver circuit and a driving method for a variable-reluctance motor (VR motor). More specifically, the invention relates to a driver circuit and a driving method, in which drive control is effected by means of a circuit for motor current control including switching devices one more in number than the phases of the motor.

BACKGROUND ART

A VR motor is a motor in which excitation current is supplied to exciting coils of a stator so that salient-pole teeth of the stator are excited, a salient-pole tooth of a rotor is attracted by means of a magnetic force of attraction generated in the salient-pole teeth of the stator, and the rotor is rotated by means of the resulting rotatory force. This motor is provided with switching devices for supplying excitation current to the exciting coils for individual phases, and the switching devices are opened and closed in response to the rotational angle of the motor, whereby the exciting coils for the individual phases are excited to rotate the rotor.

In the case of a three-phase VR motor with A-, B- and C-phases, for example, an A-phase switching device is closed to connect an A-phase exciting coil and a DC power source, thereby starting to supply current. When an A-phase salient-pole tooth attracts the salient-pole tooth of the rotor so that the rotor rotates through a predetermined angle, the A-phase switching device is opened to suspend current supplying. Then, a B-phase switching device is closed to excite a B-phase exciting coil. The motor is rotated in one direction by successively exciting the A-, B-, and C-phase coils in a like manner, thereafter. In reversing the motor, the motor can be reversed by exciting the A-, C-, and B- phase coils in the order named.

In controlling the current flowing through each exciting coil of this VR motor according to the pulse-width modulation system (PWM system), driver circuits must be formed independently for the individual phases. Therefore, each phase requires four switching devices or a combination of two switching devices and two diodes. Thus, a driver circuit of the conventional VR motor requires use of a number of switching devices and diodes, so that the driver circuit itself is increased greatly in cost, and requires two cables for each phase. Accordingly, the driver circuit becomes more expensive, and its wiring entails more man-hours.

An arrangement improving this point has been disclosed in a patent application in Japan (Jpn. Pat. Appln. No. 4-84966). According to this patent application, there is provided a driver circuit which requires use of only (N+1) switching devices where N is the number of phases of the VR motor.

The circuit diagram of FIG. 2 shows an example of the driver circuit of the three-phase VR motor in which the number of switching devices is equal to "phase number+1."

In FIG. 2, reference numeral 1 denotes a rectifier circuit which rectifies three-phase alternating currents R, S and T to generate a DC voltage (main voltage) V. C1 designates a smoothing capacitor. In this driver circuit, a common series circuit is formed such that one end of a common switching device Q1 for pulse width modulation (PWM) operation is connected to a positive terminal of the rectifier circuit 1, and the cathode of a diode D1 is connected to the other end of the device Q1, the anode of the diode D1 being connected to a negative terminal of the rectifier circuit 1.

Moreover, this driver circuit is provided with series circuits for the individual phases, that is, the A-, B-, and C-phases, such that one end of each of switching devices (transistors) Q2, Q3 and Q4 for alternatively exciting the A-, B-, and C-phase coils is connected to the negative terminal of the rectifier circuit 1, the other ends are connected individually to the respective anodes of diodes D2, D3 and D4. The respective cathodes of the diodes D2, D3 and D4 are connected to the positive terminal of the rectifier circuit 1.

The junctions of the switching devices Q2, Q3 and Q4 and the diodes D2, D3 and D4 of the series circuit for the individual phases are connected to one ends of their corresponding exciting coils of the reluctance motor, while the respective other ends of the exciting coils are connected to the junction of the switching device Q1 and the diode D1 of the common series circuit.

As described above, the switching devices in this driver circuit include a common one (common switching device Q1) and one for each phase.

In FIG. 2, symbols ZA, ZB and ZC designate the impedances of the A-, B-, and C-phase coils of the VR motor, respectively. Also provided are current detectors for detecting currents $i_a$, $i_b$, and $i_c$ flowing through the individual coils. In the example shown in FIG. 2, current detecting resistors Ra, Rb and Rc are shown as detectors based on current detecting resistances. Symbol $i_t$ designates a total current given by $i_t=i_a+i_b+i_c$.

In connection with this arrangement, the drive of the VR motor, that is, excitation of the coils, taking the case of excitation of the A-phase coil, will be described.

(1) When a positive voltage is applied to the A-phase coil to increase the A-phase current $i_a$:

The A-phase switching device Q2 is turned on, the switching devices Q3 and Q4 for the other phases are turned off, and the switching device Q1 is turned on and off in response to a PWM signal. Thereupon, when the switching device Q1 is on, the current $i_a$ flows through the common switching device Q1, A-phase coil (Ra; ZA), and A-phase switching device Q2 in the order named, and the voltage V is applied to the A-phase coil, so that the current $i_a$ flowing through the A-phase coil increases. When the switching device Q1 is turned off, on the other hand, energy accumulated in the A-phase coil causes the current $i_a$ to flow through the diode D1 of the common series circuit, A-phase coil (Ra; ZA), and A-phase switching device Q2 in the order named, and a voltage "0" is applied to the A-phase coil.

Thus, if the duty ratio of the PWM signal for turning on and off the common switching device Q1 is ηa, an average voltage applied to the A-phase coil, in the process of applying the positive voltage to the A-phase coil, is equal to the product of the duty ratio ηa and the main voltage V, that is, (ηa×V).

(2) When a negative voltage is applied to the A-phase coil to reduce the A-phase current $i_a$:

In order to apply the negative voltage to the A-phase coil, all of the A-, B-, and C-phase switching devices Q2, Q3 and Q4 are turned off.

When the common switching device Q1, whose operating state is changed in response to the PWM signal, is on, the current $i_a$ flows through the common switching device Q1, A-phase coil (Ra; ZA), and A-phase diode D2 in the order named, and the voltage "0" is applied to the A-phase coil.

When the common switching device Q1 is off, on the other hand, the current $i_a$ flows through the diode D1 of the common series circuit, A-phase coil (Ra; ZA), and A-phase diode D2 in the order named, and a voltage "−V" is applied to the A-phase coil.

Thus, in the process of applying the negative voltage to the A-phase coil, the average voltage applied to the A-phase coil takes a value obtained by multiplying the difference between 1 and the duty ratio ηa by the product of the main voltage V and minus 1, that is, $(1-\eta a) \times (-V)$.

Through the operations (1) and (2) described above, the A-phase exciting current $i_a$ is controlled by means of the PWM signal so as to follow up a command current duping an A-phase excitation section. When the motor rotates so that the excitation phase changes to the B-phase, the switching devices Q2 and Q3 are turned off and on, respectively, which indicates only that the switching device Q3 serves in place of the switching device Q2 in the case of A-phase excitation described above. Thus, the operation of the switching devices Q1 and Q3 and the voltage applied to the B-phase coil have the same relationship as in the case of the A-phase. Likewise, when the motor rotates for C-phase excitation, the role of the switching device Q2 for the A-phase excitation is only replaced with that of the switching device Q4, and thus the operation and the voltage applied to the C-phase coil is substantially the same as in the case of the A- and B- phase coils.

FIGS. 4A and 4B are diagrams for illustrating the relationships between the coil currents $i_a$, $i_b$ and $i_c$ for the individual phases, total current $i_t$, and command current $i_{cmd}$ in this driver circuit.

In the case of the A-phase excitation, the A-phase current $i_a$ is controlled in accordance with the duty ratio ηa of the PWM signal, which is settled depending on a current deviation equivalent to the difference between the command current $i_{cmd}$ and the A-phase current $i_a$, so as to rise and follow up the current command $i_{cmd}$. When the excitation mode is changed from the A-phase excitation to the B-phase excitation in the next stage, the B-phase current $i_b$ rises and is controlled in accordance with a duty ratio ηb, which is settled depending on a current deviation equivalent to the difference between the command current $i_{cmd}$ and the detected B-phase current $i_b$. However, the fall of the A-phase current immediately after the change to the B-phase excitation is not controlled at all.

Since the switching device Q2 is off immediately after the start of the B-phase excitation, the current (last-transition current) flowing through the A-phase coil flows through the common switching device Q1, A-phase coil, and A-phase diode D2 in the order named, and the voltage "0" is applied to the A-phase coil when the common switching device is on. When the common switching device is off, on the other hand, the current flows through the diode D1 of the common series circuit, A-phase coil, and A-phase diode D2 in the order named, and the "−V" is applied to the A-phase coil. As in the case of the aforesaid operation (2), therefore, the average voltage applied to the A-phase coil is given by $(1-\eta b) \times (-V)$.

The A-phase current $i_a$ is drastically reduced when the excitation phase is changed, and becomes 0 after the passage of a certain time ($t_{ab}$). In the section $t_{ab}$ for the excitation phase change from the A-phase to the B-phase, the total current $i_t$ flowing through the motor is equal to the sum of the A-phase last-transition current and the B-phase first-transition current.

As mentioned before, however, the falling A-phase current $i_a$ is not controlled (because the average voltage for the A-phase is based not on the duty ratio ηa to be settled depending on the A-phase current deviation, but on the duty ratio ηb to be settled depending on the B-phase current deviation), although the B-phase current $i_b$ is controlled. Accordingly, the total current $i_t$ of the motor is not controlled for the section $t_{ab}$. After the A-phase current $i_a$ becomes "0" when the section $t_{ab}$ terminates, the B-phase current $i_b$ is equivalent to the total current $i_t$ ($=i_b$).

The same also applies to the cases of excitation phase changes from the B-phase to the C-phase and from the C-phase to the A-phase. As shown in FIGS. 4A and 4B, the total current $i_t$ of the motor is not controlled in specific sections $t_{ab}$, $t_{bc}$ and $t_{ca}$ for phase changes.

In other sections than the excitation phase changing sections $t_{ab}$, $t_{bc}$ and $t_{ca}$, as described above, the total current $i_t$ is a current for each excitation phase, and this current is controlled so as to follow up the command current $i_{cmd}$. In the phase changing sections $t_{ab}$, $t_{bc}$ and $t_{ca}$, however, only the first-transition current is controlled so as to follow up the command current $i_{cmd}$, and the last-transition current is not controlled. After all, the total current $i_t$ of the motor is not controlled, resulting in a torque ripple. In FIG. 4B, a fine line is used to indicate that the total current $i_t$ of the motor is not controlled in sections $t_{ab}$, $t_{bc}$ and $t_{ca}$ for changes, and therefore, cannot be securely made coincident with the command current $i_{cmd}$.

In the case where the driver circuit of the VR motor is a driver circuit in which the number of switching devices used for the control is equal to (phase number+1), as described above, the current deviation equivalent to the difference between the command current $i_{cmd}$ and the detected current for the phase concerned is obtained for each phase, and the current for the phase concerned is controlled in accordance with the duty ratio for the phase concerned which depends on the current deviation. Accordingly, a current detector for detecting the current for each phase must be provided for each phase. Moreover, there are sections for the excitation phase changes in which the total current of the motor cannot be controlled, so that a torque ripple may be caused.

DISCLOSURE OF THE INVENTION

The object of the present invention is to provide a driver circuit and a driving method for a VR motor, which requires use of only one current detector, and can prevent the occurrence of a torque ripple.

In order to achieve the above object, according to a method of the present invention, a current detector, in a VR motor driven by a driver circuit comprising switching devices one more in number than the phases of the VR motor, is mounted in a position such that a total current equal to the sum of currents flowing through individual coils of the VR motor can be detected, and a current loop process is executed such that the total current detected by means of the current detector follows up a current command.

Further, a circuit according to the present invention comprises: a rectifier circuit; a common series circuit including a common switching device for PWM operation and a diode, one end of the common switching device being connected to a positive terminal of the rectifier circuit, and the cathode and anode of the diode being connected to the other end of the common switching device and a negative terminal of the rectifier circuit, respectively; a series circuit including switching devices for alternatively exciting the coils for the individual phases and diodes, one end of each of the switching devices being connected to the negative terminal of the rectifier circuit, the other end being connected to the anode of corresponding diodes, and the cathode of each of the diodes being connected to the positive terminal of the rectifier circuit, the junction of the switching device of the series circuit for each phase and the corresponding diode being connected to one end of a corresponding exciting coil of the reluctance motor, a current detector being mounted in a position such that a total current equal to the sum of currents flowing through the individual coils of the motor can be detected, and connected between the junction of the switching device and the diode of the common series circuit and the respective other ends of the individual exciting coils; and a control circuit for receiving a current value transmitted from the current detector, a command current value, a main voltage value delivered from the rectifier circuit, and a detected value of the rotor electrical angle of the reluctance motor, computing the duty ratio of a pulse width modulation signal for switching the switching device of the common series circuit, and outputting a signal for controlling the switching operation of the switching device in the series circuit for each of the phases.

According to the present invention, as described above, the total current equal to the sum of the currents flowing through the individual coils of the motor is detected by the single current detector, and the same current loop control as the conventional one is executed in a manner such that the detected total current follows up the current command. Thereupon, the total current follows up the current command. Thus, the total current flowing through the motor is controlled even during a period for the change of the excitation phase, so that the occurrence of a torque ripple can be restrained.

BRIEF DESCRIPTION OF THE DRAWINGS

FIGS. 3A and 3B are diagrams for illustrating currents for individual phases and total current, respectively, according to one embodiment of the present invention;

FIGS. 4A and 4B are diagram for illustrating currents for the individual phases and total current, respectively, in the driver circuit shown in FIG. 2; and FIG. 5 is a flow chart showing a current loop process executed by a processor of a control device for carrying out the method of the present invention.

BEST MODE FOR CARRYING OUT THE INVENTION

Figure 1:
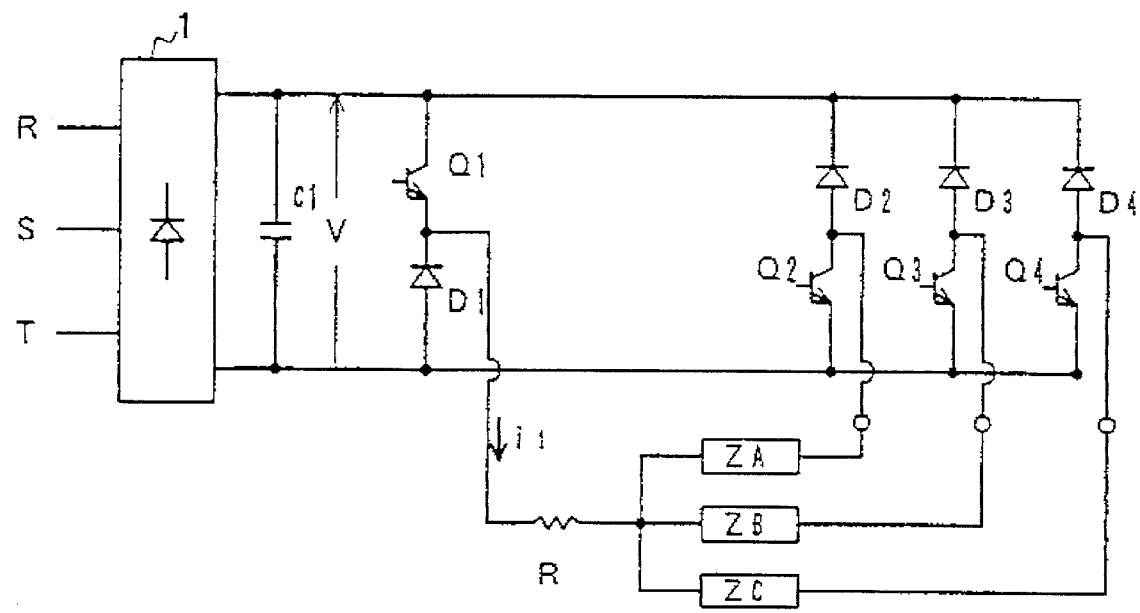
FIG. 1 is a driver circuit for a VR motor for carrying out a system according to the present invention.
Figure 2:
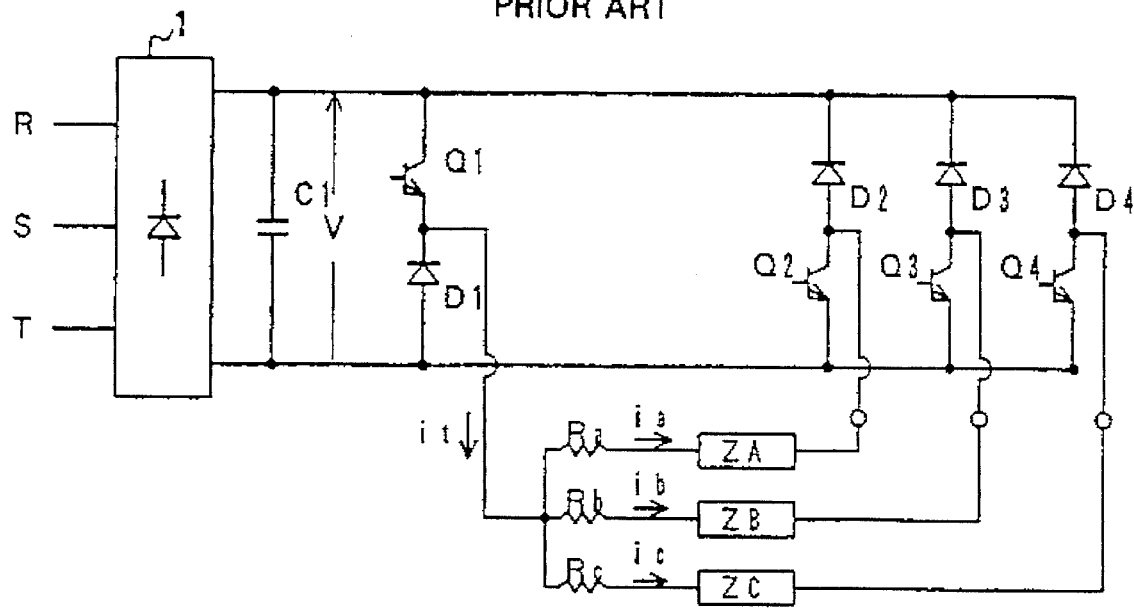
FIG. 2 is a diagram showing a conventional driver circuit which controls the current of the VR motor with use of switching devices one more in number than the phases of the motor.

FIG. 1 is a circuit diagram showing a motor driver circuit according to one embodiment of the present invention. In FIGS. 1 and 2, like symbols refer to the same components. A common switching device Q1, switching devices (transistors) Q2, Q3 and Q4 for alternatively exciting A-, B-, and C-phase coils, diodes D2, D3 and D4, etc., are connected to a rectifier circuit 1 in the same manner as in FIG. 2. The circuit of FIG. 1 differs from the conventional VR motor driver circuit shown in FIG. 2 in that only one current detector (shown as a current detecting resistor R) is used, and a total current $i_t$ equal to the sum of currents flowing through the individual phases is detected by means of the current detector R. The hardware of control means for controlling the drive of this VR motor, which is constructed in the same manner as that of the conventional one, includes a processor, ROM, RAM, and input and output circuits, etc. Only the process executed by the processor of the control means is different from the conventional one.

FIGS. 3A and 3B show the currents for individual phases and the total current, respectively, for the circuit shown in FIG. 1.

FIG. 5 is a flow chart showing a current loop process executed by the processor of the control means according to the one embodiment of the present invention (the circuit as shown in FIG. 1).

The processor of the control means, which executes the process shown in FIG. 5 for each predetermined period, first reads a current command $i_{cmd}$, and also reads the total current $i_t$ obtained by the current detector R and a rotor electrical angle θ detected by a detector for reading the rotor position of the motor (Step S1). Then, the current command $i_{cmd}$ and the read total current $i_t$ are compared. If the total current $i_t$ is not higher than the current command $i_{cmd}$, a duty ratio η of a PWM signal is obtained by subtracting the total current $i_t$ from the current command $icm_d$, multiplying the remainder by a proportional gain K of a current loop, and further dividing the product by a value V equivalent to the main voltage as the output of the rectifier circuit. In other words, the duty ratio η is obtained by making a computation according to equation (1) as follows (Step S3):

$$\eta=(K/V)(i_{cmd}-i_t). \tag{1}$$

If the total current $i_t$ is higher than the current command $i_{cmd}$, on the other hand, the duty ratio η of the PWM signal is obtained by making a computation according to equation (2) as follows (Step S4):

$$\eta=1+(K/V)(i_{cmd}-i_t). \tag{2}$$

Then, the excitation phase is settled in accordance with the rotor electrical angle θ read in Step S1 (Steps S5 and S6). If the detected total current $i_t$ is less than or equal to the current command $i_{cmd}$ in the case of A-phase excitation (Step S7), the aforesaid operation (1) must be performed to increase the total current $i_t$. Accordingly, the switching device Q2 corresponding to the A-phase is turned on, the PWM signal is outputted so that the switching device Q1 is turned on and off with the duty ratio η obtained in Step S3, and the other switching devices Q3 and Q4 are turned off, whereby the A-phase current is increased to augment the total current $i_t$ (Step S8). As mentioned before, the voltage applied to the A-phase coil is equivalent to the main voltage V as the output of the rectifier circuit 1 when the switching device Q1 is on, and is "0" when the switching device Q1 is off. At this time, therefore, an average voltage applied to the A-phase coil is given as follows:

$$\begin{aligned}\text{Average voltage} &= \eta \times V \\ &= (K/V)(i_{cmd}-i_t)\times V \\ &= K(i_{cmd}-i_t).\end{aligned} \tag{3}$$

If the detected total current $i_t$ is higher than the current command $i_{cmd}$ (Step S7), on the other hand, the aforesaid operation (2) must be performed to reduce the total current $i_t$. Accordingly, the switching devices Q2, Q3 and Q4 are turned off, and the PWM signal is outputted so that the switching device Q1 is turned on and off with the duty ratio η obtained in Step S4, whereby the A-phase current is lowered to reduce the total current $i_t$ (Step S9).

As mentioned above, in this case, the voltage applied to the A-phase coil is "0" when the switching device Q1 is on, and is "–V" when the switching device Q1 is off. As a result, the average voltage takes a value given by equation (4) as follows:

$$\begin{aligned}\text{Average voltage} &= (1-\eta)(-V) \\ &= -(K/V)(i_{cmd}-i_t)(-V) \\ &= K(i_{cmd}-i_t).\end{aligned} \quad (4)$$

As seen from equations (3) and (4) described above, the average voltage applied to the A-phase coil takes a value equal to the product of the proportional gain K and a current deviation obtained by subtracting the total current $i_t$ from the current command $i_{cmd}$, and proportional control is executed in a manner such that the total current $i_t$ follows up the command current $i_{cmd}$, without regard to the relationship between the total current $i_t$ and the current command $icm_d$.

If it is concluded in Step S6 that the excitation phase is the B- or C-phase, the same process (Step S10 or S13) as Step S7 for the A-phase is executed, whereupon the current command $i_{cmd}$ and the total current $i_t$ are compared. If the current command $i_{cmd}$ is higher, or equal to $i_t$ the switching device Q3 is turned on, while the switching devices Q2 and Q4 are turned off, in the case of B-phase excitation. In the case of C-phase excitation, the switching device Q4 is turned on, while the switching devices Q2 and Q3 are turned off. In this state, the switching device Q1 is switched in response to the PWM signal with the duty ratio $\eta$ obtained in Step S3 (Step S11 or S14). If the total current $i_t$ is higher than the current command $i_{cmd}$, on the other hand, the switching devices Q2, Q3 and Q4 are turned off, and the switching device Q1 is switched with the duty ratio $\eta$ obtained in Step S4 (Steps S12 and S15).

The above-described processes are executed for each predetermined period so that the voltage of the value obtained by multiplying the current deviation, or the difference between the current command $i_{cmd}$ and the detected total current $i_t$, by the proportional gain K of the current loop is applied to the excitation phase, whereby the total current $i_t$ is controlled so as to follow up the command current $icm_d$.

A control circuit (not shown in FIG. 1) is used to obtain the duty ratio $\eta$ of the PWM signal in Steps S3 and S4 and obtain control signals for turning on and off the switching devices Q2, Q3 and Q4 for the individual phases in Steps S8, S9, S11, S12, S14 and S15. In order to compute these values, this control circuit receives the current command value $i_{cmd}$, detected total current $i_t$, rotor electrical angle $\theta$, and output (main voltage V) of the rectifier circuit 1.

In FIG. 3B, a solid line is used to indicate that the total current $i_t$ of the motor is controlled in sections $t_{ab}$, $t_{bc}$ and $t_{ca}$ for changes, and therefore, can be securely made coincident with the command current $i_{cmd}$.

According to the present invention, it is necessary only to detect the total current equal to the sum of the currents flowing through the coils of the individual phases, so that only one current detector will suffice. Since the current loop process is executed so that the total current follows up the current command, moreover, the current flowing through the motor is continuously controlled even during a period for the change of the excitation phase, so that the occurrence of a torque ripple can be restrained.

We claim:

1. A driver circuit for a variable-reluctance motor having individual exciting coils for respective phases, said driver circuit comprising:

a rectifier circuit having positive and negative terminals;

a common series circuit for delivering a main voltage from said rectifier circuit to the individual coils of the motor, said common series circuit including a common switching device for pulse width modulation operation and a first diode, one end of said common switching device being connected to the positive terminal of said rectifier circuit, and a cathode and an anode of said first diode being connected to the other end of said common switching device and the negative terminal of said rectifier circuit, respectively;

a series circuit including switching devices for alternately exciting the coils for the individual phases, and second diodes, respective first ends of said switching devices of said series circuit being connected to the negative terminal of said rectifier circuit, the respective other ends being connected to respective anodes of said second diodes, and each of respective cathodes of said second diodes being connected to the positive terminal of said rectifier circuit;

the junction of the switching device of the series circuit for each phase and the corresponding second diode being connected to one end of the corresponding exciting coil of the motor;

a current detector to detect a current value of a total current equal to the sum of currents flowing through the individual coils of the motor and connected at one end to the junction of the common switching device and said first diode of said common series circuit and at the other end to the respective other ends of said exciting coils; and a control circuit to receive the current value transmitted from said current detector, a command current value, a value of the main voltage delivered from said rectifier circuit, and a detected value of the rotor electrical angle of the reluctance motor, said control circuit computing a duty ratio of a pulse width modulation signal for switching said common switching device of said common series circuit, and outputting a signal for controlling the switching operation of the corresponding switching device in the series circuit for each said phase.

2. The driver circuit for a variable-reluctance motor according to claim 1, wherein said current detector is located between a common junction of the respective other ends of said individual exciting coils and the junction of said common switching device and said first diode of said common series circuit.

3. The driver circuit for a variable-reluctance motor, according to claim 1, wherein said current detector is a resistor.

* * * * *

UNITED STATES PATENT AND TRADEMARK OFFICE
CERTIFICATE OF CORRECTION

PATENT NO.   : 5,543,700
DATED        : August 6, 1996
INVENTOR(S)  : Tetsuro SAKANO, et al.

It is certified that error appears in the above-indentified patent and that said Letters Patent is hereby corrected as shown below:

Title page, item [57],

Line 1, delete "is";
            delete "means of";

Line 2, change "which is composed of" to --including--; and

Line 6, change "PWM" to --pulse width modulation--.

Signed and Sealed this

Twenty-sixth Day of November 1996

*Attest:*

BRUCE LEHMAN

*Attesting Officer*      *Commissioner of Patents and Trademarks*